United States Patent [19]

Matsuda

[11] Patent Number: 4,480,187

[45] Date of Patent: Oct. 30, 1984

[54] MASS SPECTROMETER

[75] Inventor: Hisashi Matsuda, Takarazuka, Japan

[73] Assignee: Esco Co., Ltd., Tokyo, Japan

[21] Appl. No.: 402,257

[22] Filed: Jul. 27, 1982

[30] Foreign Application Priority Data

Jul. 29, 1981 [JP] Japan ............................... 56-118645

[51] Int. Cl.[3] .............................................. B01D 55/44

[52] U.S. Cl. .................................... 250/296; 250/299; 250/396 R

[58] Field of Search ............... 250/294, 296, 298, 299, 250/396 R

[56] References Cited

U.S. PATENT DOCUMENTS

| | | | |
|---|---|---|---|
| 3,405,363 | 10/1968 | Brown | 250/396 R |
| 3,524,056 | 8/1970 | Enge et al. | 250/299 |
| 4,078,176 | 3/1978 | Matsuda | 250/296 |
| 4,174,479 | 11/1979 | Tuithof et al. | 250/299 |

*Primary Examiner*—Bruce C. Anderson

*Attorney, Agent, or Firm*—Spensley Horn Jubas & Lubitz

[57] ABSTRACT

In a mass spectrometer of the magnetic field type for analyzing the mass of ions by causing an ion beam to pass through a narrow slit and then through a deflecting magnetic field to be detected by an ion detector where the intensity of the deflecting magnetic field is varied, plural electrostatic quadrupole lenses are provided between the source slit and the deflecting magnetic field so as to give a converging property to an ion beam passing in a direction vertical to the median plane thereof and to give a diverging property to an ion beam passing in the direction of the radius thereof. This minimizes the gap spacing between the magnetic pole pieces which form the deflecting magnetic field, thereby improving sensitivity and detection as well as accuracy and measurement. Since the magnetic field can be intensified by making the gap spacing between the magnetic pole pieces narrower, the present device is applicable to a wider scope of uses, such as to the analysis of ions of greater mass or ions of higher molecules.

18 Claims, 15 Drawing Figures

FIG. 7(a).
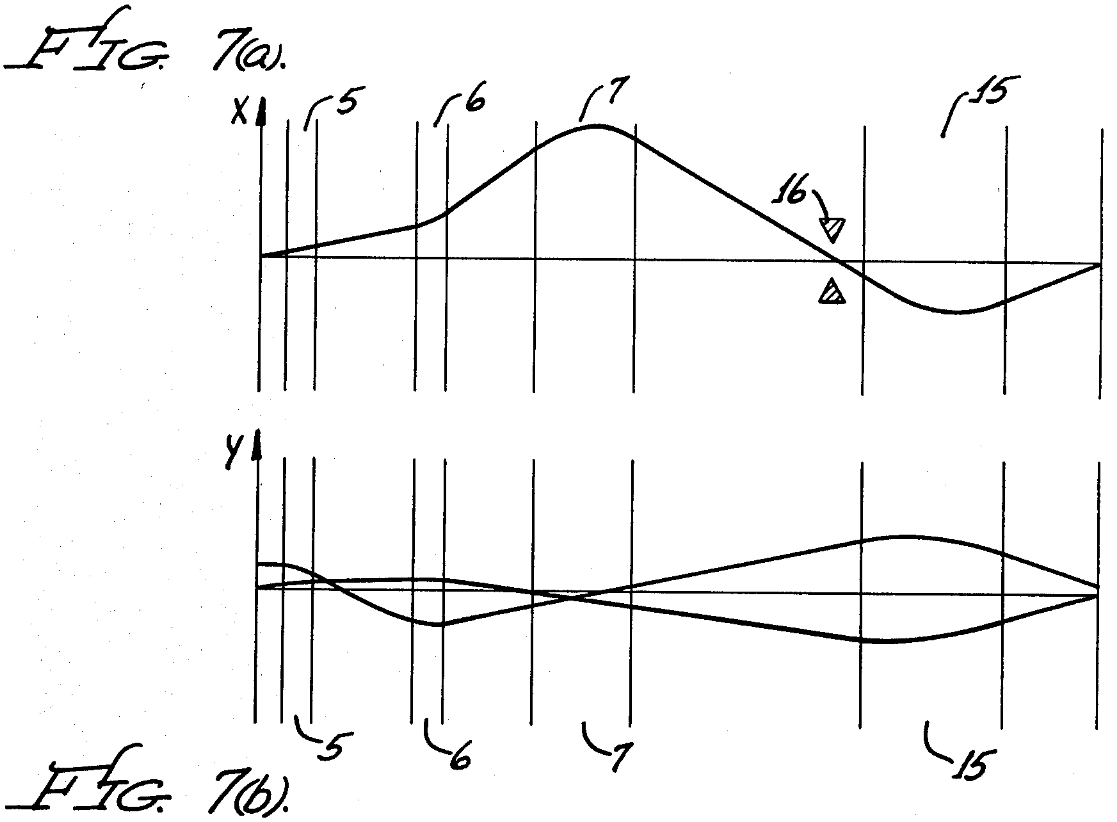
FIG. 7(b).
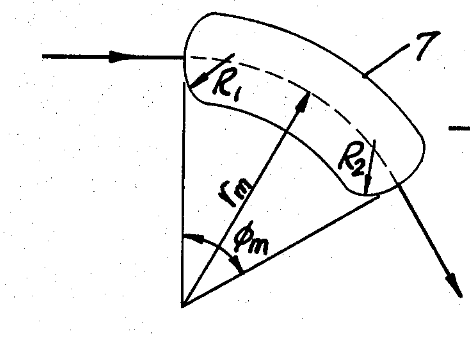
FIG. 8.
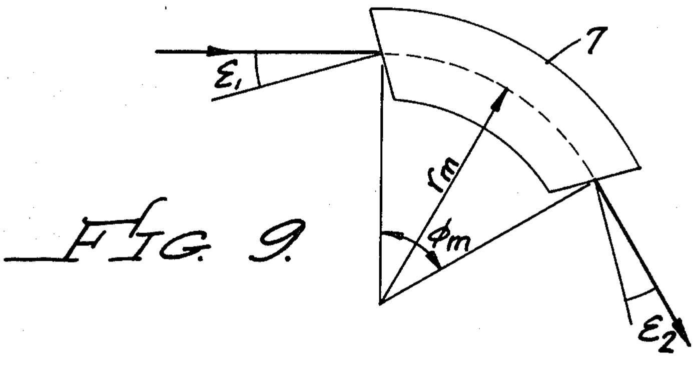
FIG. 9.

MASS SPECTROMETER

BACKGROUND OF THE INVENTION

1. Field of the Invention

The present invention relates to a mass spectrometer for measuring the mass of ions and, more particularly, to a mass spectrometer of the magnetic field type for analyzing the mass of ions by causing an ion beam to pass through a narrow slit and then through a deflecting magnetic field to be detected by an ion detector where the intensity of the deflecting magnetic field is varied.

2. Description of the Prior Art

In a mass spectrometer of the magnetic field type, if it is assumed that the slit width of an ion source is "s", the slit width of an ion detector is "d", the mass dispersion coefficient is $A_\gamma$, the image magnification is $A_x$, and the spread of the image by aberration is Δ, the resolution R of the mass spectrometer is generally expressed by the equation:

$$R = \frac{A_\gamma}{A_x s + \Delta + d} \quad (1)$$

The relationship $d = A_x s + \Delta$ should exist in order to detect ions at a higher efficiency. In order to improve the resolution R, values have to be determined for the constants on the right side of equation (1) so as to set the numerator at a larger value and the denominator at a smaller value. If the slit width s is made narrower, however, the volume of ions extracted from the ion source is reduced, thereby lowering the sensitivity. It is desirable, therefore, to reduce the image magnification $A_x$ and, at the same time, to lower the aberration Δ to attain a smaller denominator.

The ion beam emitted from the slit of the ion source is made to pass through a deflecting magnetic field. As the ion beam advances, it diverges to widen the width thereof whereas when the mass of the ion to be analyzed is large, the magnetic field has to be intensified and the gap spacing between the magnetic pole pieces has to be made smaller. In conventional devices, an ion beam may be set at 5 to 15 mm in width in a direction vertical to the median plane (the y direction), but the gap spacing between the magnetic pole pieces must be narrower than that range in order to measure the mass of high molecular compounds of a molecular weight as high as several thousand. As a result, an ion beam has only been partially utilized in the prior art.

SUMMARY OF THE INVENTION

According to the present invention, the difficulties encountered heretofore are obviated by providing a system in which detection sensitivity and measurement precision are improved by making the width of the ion beam smaller in a direction vertical to the median plane as well as making the gap between the magnetic pole pieces forming a deflecting magnetic field narrower and by making the ion beam diverge in the radial direction thereof.

Briefly, the present invention is characterized in that plural electrostatic quadrupole lenses are provided between an ion source slit and a deflecting magnetic field so as to give a converging property to an ion beam passing in a direction vertical to the median plane thereof and to give a diverging property to an ion beam passing in the direction of the radius thereof. The electrostatic quadrupole lenses are desirably two in number and they are disposed with an appropriate interval therebetween.

It is preferred to give a stigmatic second order focusing property to the ion beam within the deflecting magnetic field by varying the intensity of the electric field of the electrostatic quadrupole lenses, by varying the deflecting angle of the deflecting magnetic field, by varying the incident angle of the ion beam in the deflecting magnetic field, etc., or by making the boundary surface of the deflecting magnetic field a curved surface.

The ion beam may be given a stigmatic second order double focusing property by providing a toroidal electric field through which the ion beam is made to pass after having passed through the deflecting magnetic field.

OBJECTS, FEATURES AND ADVANTAGES

It is therefore an object of the present invention to obviate the difficulties encountered heretofore in mass spectrometers of the magnetic field type. It is a feature of the present invention to solve these problems by the provision of plural electrostatic quadrupole lenses between an ion source slit and a deflecting magnetic field. An advantage to be derived is a mass spectrometer having improved detection sensitivity. A further advantage is a mass spectrometer having an improved measurement precision. A still further advantage is a mass spectrometer of higher efficiency. Another advantage is a mass spectrometer having improved resolution.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like or corresponding parts in the several figures and wherein:

BRIEF DESCRIPTION OF THE DRAWINGS

FIGS. 7(*a*) and 7(*b*) show the ion orbits of the embodiment of FIG. 6 in the vertical and radial planes;

FIGS. 8 and 9 are schematic views showing embodiments of the boundaries of the deflecting magnetic field.

DESCRIPTION OF THE PREFERRED EMBODIMENTS

Figure 1:
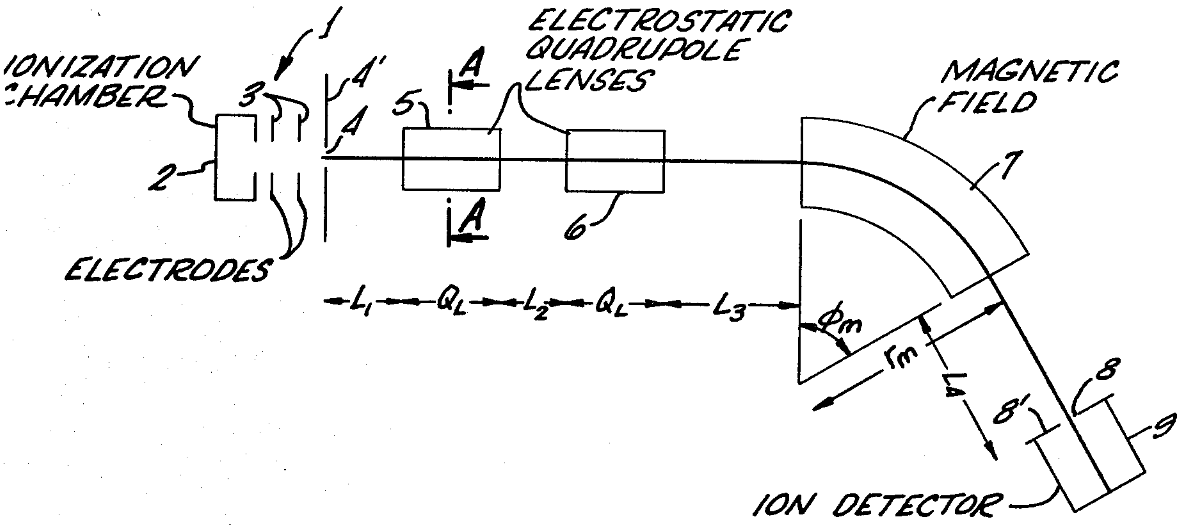
FIG. 1 is a schematic view of a first embodiment of the present invention.

Referring now to the drawings and, more particularly, to FIG. 1 thereof, there is shown a mass spectrometer of the magnetic field type including an ion source 1 comprising an ionization chamber 2 and plural accelerating electrodes 3 which emit an accelerated ion beam. The beam exits ion source 1 through a slit 4 in a shield or wall 4'. According to this embodiment of the present invention, the ion beam passes through two electrostatic quadrupole lenses 5 and 6 before entering a deflecting magnetic field 7 (the magnetic pole pieces forming the field 7 not being shown). The ion beam is deflected within magnetic field 7 along a radius $r_m$ and through an angle $\phi_m$ so as to pass through a detector slit 8 in a wall 8' to be captured by an ion detector 9. The apparatus (not shown) forming the deflecting magnetic field 7 is so constructed that the intensity of the magnetic field can be varied externally. The position of detector slit 8 is fixed. The ion beam is accelerated so that the kinetic energy of the ions entering deflecting magnetic field 7 is made constant. As the ions entering the deflecting magnetic field 7 vary in their momentum depending on the mass, they are deflected by an angle determined by the mass. Therefore, by varying the intensity of magnetic field 7, ion detector 9 captures ions of different masses, thereby enabling the analysis of the mass.

It should also be mentioned that the devices shown in the figures of the drawings are intended to be disposed in a vacuum but the vacuum cases are not shown.

The present invention is characterized in that electrostatic quadrupole lenses 5 and 6 are provided between slit 4 and deflecting magnetic field 7 and that lenses 5 and 6 are designed to give the passing ion beam a converging property in a direction vertical to the median plane thereof and a diverging property in a direction radial thereto.

Figure 2:
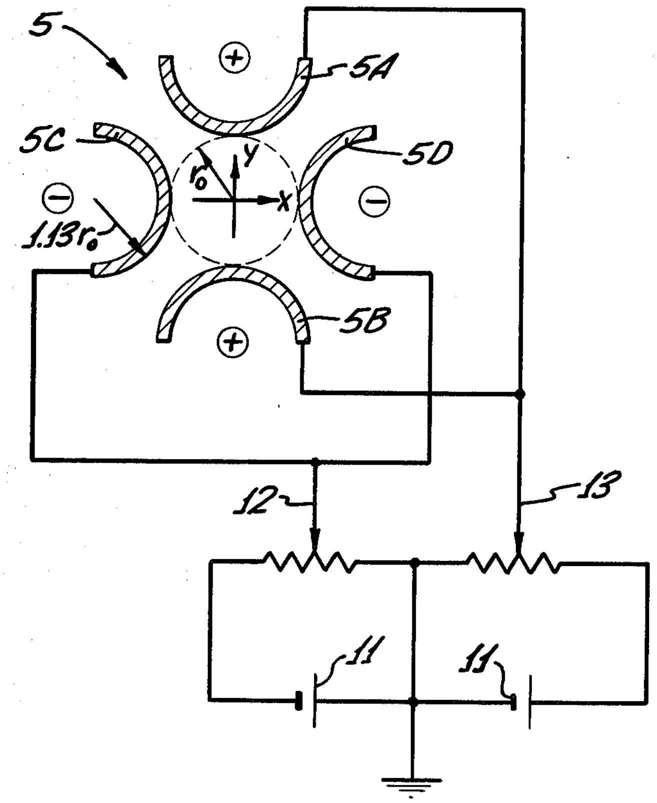
FIG. 2 is a view showing the cross section of one of the electrostatic quadrupole lenses, taken along the line A—A of FIG. 1, and an example of a voltage supply therefor.

Referring now to FIG. 2, if electrostatic quadrupole lens 5 is sectioned crosswise in a direction vertical to the direction of a passing ion beam, it has the form of four half cylinders 5A, 5B, 5C, and 5D. Opposing electrodes 5A and 5B, which are positioned vertical to the median plane of the ion beam (the y direction), are supplied with a positive potential whereas opposing electrodes 5C and 5D, positioned along the median plane of the ion beam (the x direction), are provided with a negative potential. If it is assumed that the radius of an inscribed circle formed by the four electrodes 5A–5D is $r_0$, the diameters of the electrodes are preferably within the range of $1.05-1.20r_0$. According to the preferred embodiment, the diameters of the electrodes are preferably $1.13r_0$. The positive and negative voltages are supplied via two potentiometers 12 and 13 from a power source 11 which is grounded at the center point thereof.

Electrostatic quadrupole lens 6 is preferably identical to lens 5 and is supplied with voltages in the same manner shown in FIG. 2. The voltages applied to lenses 5 and 6 may either be equal or arranged separately.

Figure 3A:
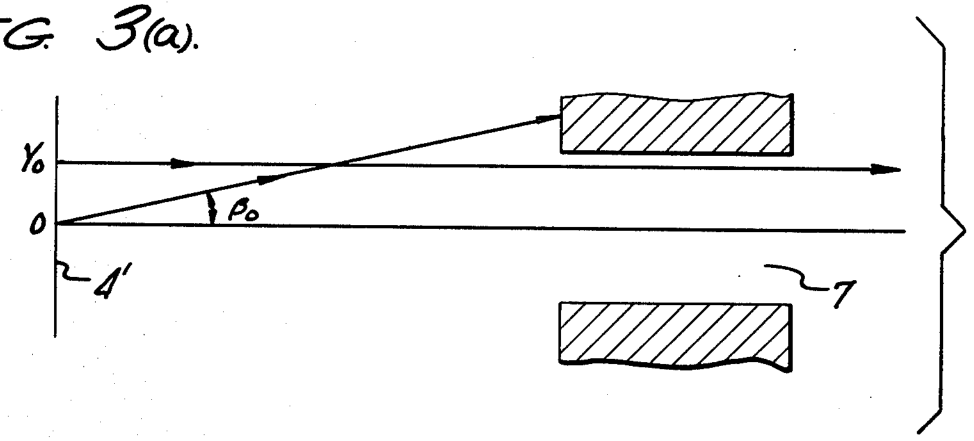
FIGS. 3(*a*)–3(*c*) are a series of explanatory views of ion orbits of the mass spectrometer of FIG. 1.
Figure 3B:
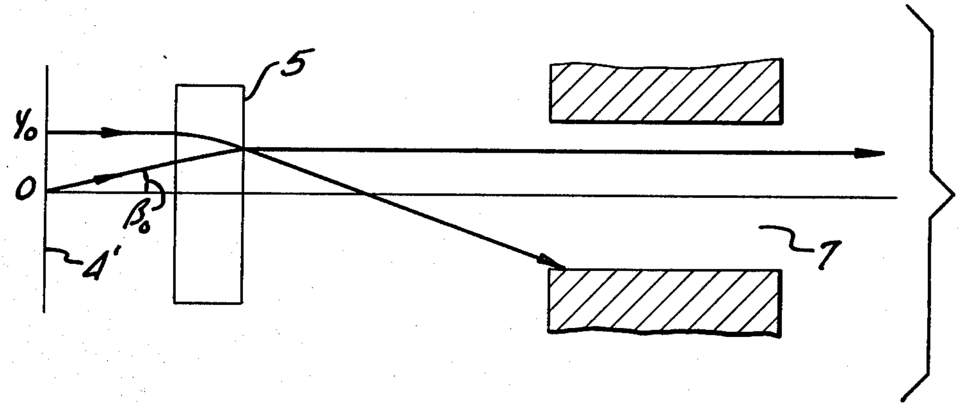
Figure 3C:
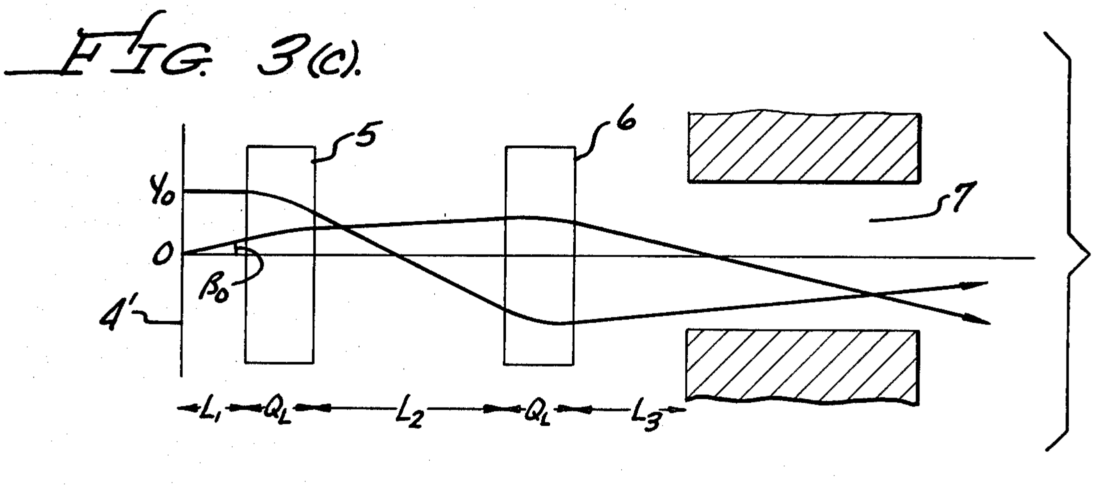

A qualitative analysis of the performance of the embodiment of FIGS. 1 and 2 can be understood with reference to FIGS. 3(*a*)–3(*c*), all of which schematically show the flow of ion beams. In each figure, there is seen ions emitted through slit 4 in wall 4'. There is especially shown an ion emitted from the center point of slit 4 at an angle of $\beta_0$ from the axis of the system and one which is emitted from the upper end $y_0$ of slit 4 in a direction parallel to the axis of the system. In FIGS. 3(*a*), with neither lens 5 nor lens 6, the ion emitted from the upper end $y_0$ of slit 4 passes through deflecting magnetic field 7, but the ion emitted from the center of slit 4 at an angle $\beta_0$ is unable to pass through magnetic field 7 or between the gap between the magnetic pole pieces which form magnetic field 7.

If, as shown in FIG. 3(*b*), a short electrostatic quadrupole lens 5 is disposed between slit 4 and magnetic field 7 and is controlled to make the ion emitted at the angle $\beta_0$ from the center of slit 4 become parallel to the axis of the system, such ion passes through magnetic field 7. On the other hand, the ion emitted parallel to the axis of the system from the upper end $y_0$ of slit 4 collides against a magnetic pole piece and cannot pass through magnetic field 7.

If, as shown in FIG. 3(*c*), two electrostatic quadrupole lenses 5 and 6 are placed between slit 4 and magnetic field 7 and the potential and the interval or the position thereof are suitably adjusted, the ion emitted at the angle $\beta_0$ from the center of slit 4 as well as the ion emitted parallel to the axis of the system from the upper end $y_0$ of slit 4 are able to pass through magnetic field 7.

If the two ions discussed above are considered to set the upper limits in the angle and position of ions passing through slit 4, all of the ions between these limits can be used effectively without collision against the magnetic pole pieces. As the width of the ion beam becomes narrower, the gap between the magnetic pole pieces can be made smaller to increase the intensity of the field.

Electrostatic quadrupole lenses of the type described have the property of diverging ion beams in the radial direction (the x direction), just similar to an optical concave lens. According to this property, a virtual image of slit 4 is focused as if an equivalent ion source approached the deflecting magnetic field, thereby making the image magnification factor $A_x$ small, hence improving resolution R.

Considering now the distance between lenses 5 and 6, if such lenses are identical to each other, as shown in FIG. 1, the ion beam must cross the optical axis before the halfway point between the two lenses in order to become narrower than $y_0$ as it advances toward an upper oblique direction in the magnetic field after it emerges from slit 4, advances in parallel to the optical axis, and emerges from lens 6. In other words, the focal length should be shorter than one half the distance from lens 5 to lens 6 as expressed as follows:

$$\frac{\cot(Q_k \cdot Q_L)}{Q_k} < \frac{1}{2} L_2, \tag{2}$$

where:

$Q_k$: constant to express the intensity of each lens, $Q_L$: the lens length measured in the same units as $r_m$, and $L_2$: the distance from lens 5 to lens 6.

If we further assume that:

U: the ion accelerating voltage,

V: the lens supplying voltage, and $r_0$: the radius of the inscribed circle of electrodes 5A–5D, then:

$$Q_k = \sqrt{\frac{V}{U}} \cdot \frac{1}{r_0}. \quad (3)$$

All lengths are normalized by the radius of the orbit of deflecting magnetic field 7. In the case where the two lenses 5 and 6 are not identical to each other, $Q_k$ is calculated on the basis of the geometric mean.

Figure 4:
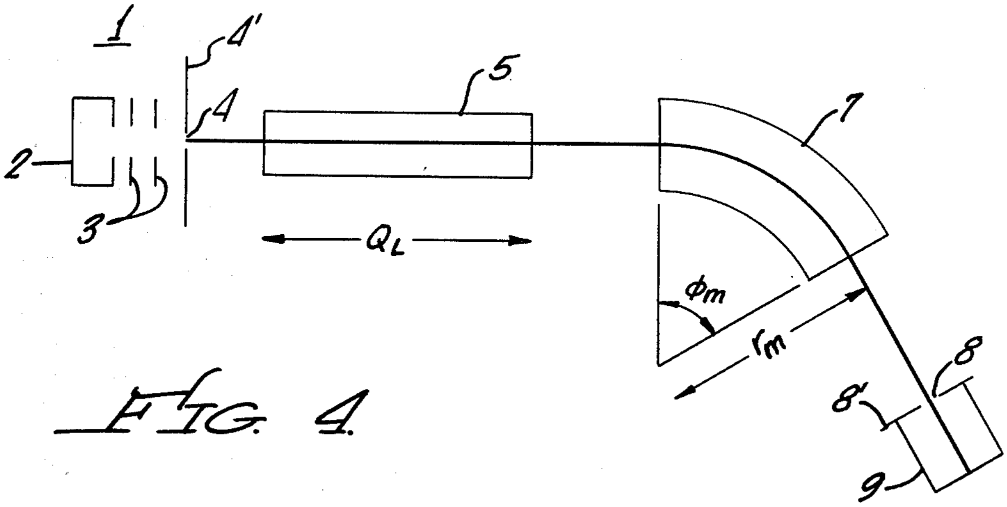
FIG. 4 is a schematic view of a second embodiment of the present invention.

If an electrostatic quadrupole lens is selected having a sufficient length, a performance similar to that described above can be achieved using a single lens. FIG. 4 shows such an example wherein a long electrostatic quadrupole lens 5 is provided between wall 4' and deflecting magnetic field 7. In this case, lens 5 has to have a considerable length and lens 6 is omitted. The remaining structure is similar to that shown in FIG. 1.

Figure 5:
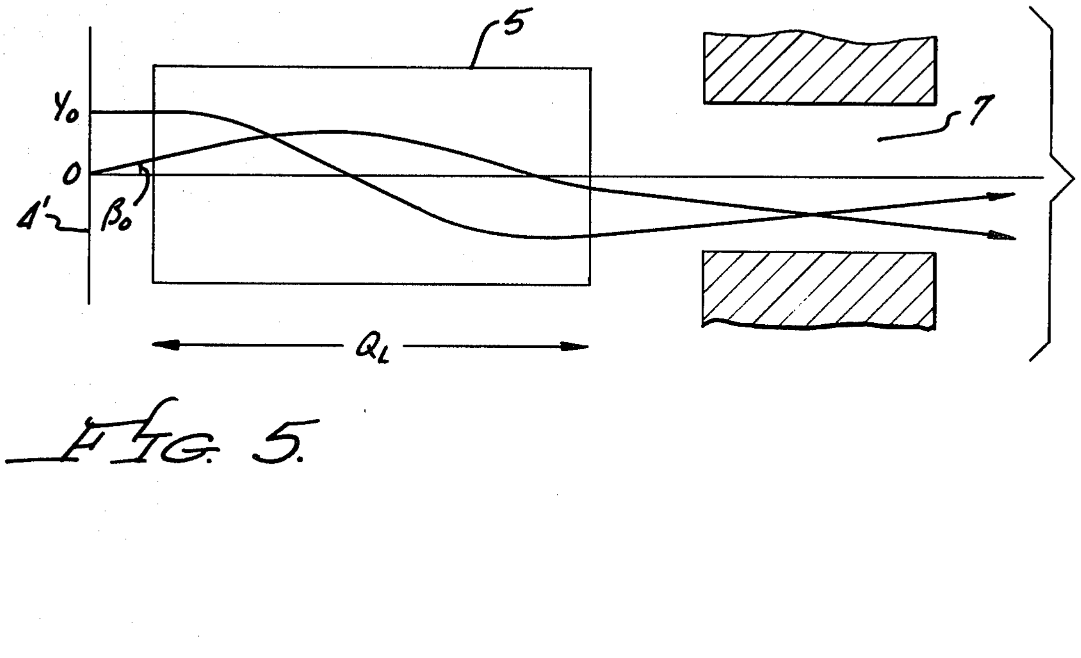
FIG. 5 is a view similar to FIGS. 3(*a*)–3(*c*) for the embodiment of FIG. 4.

FIG. 5 explains the performance of such a long electrostatic quadrupole lens and particularly shows an ion emitted at an angle $\beta_0$ from the center of slit 4 and one emitted parallel to the system axis from the upper end $y_0$ of slit 4, similar to that described with regard to FIGS. 3(*a*)–3(*c*). If the length of lens 5 is long, the two ion paths can be constructed to pass through magnetic field 7, as shown. The formula which determines the length $Q_L$ of lens 5 is:

$$|Q_L \cdot Q_k| > \pi. \quad (4)$$

Besides the above-mentioned example, the provision of electrostatic quadrupole lenses having a number of three or more can achieve an equivalent structure.

Figure 6:
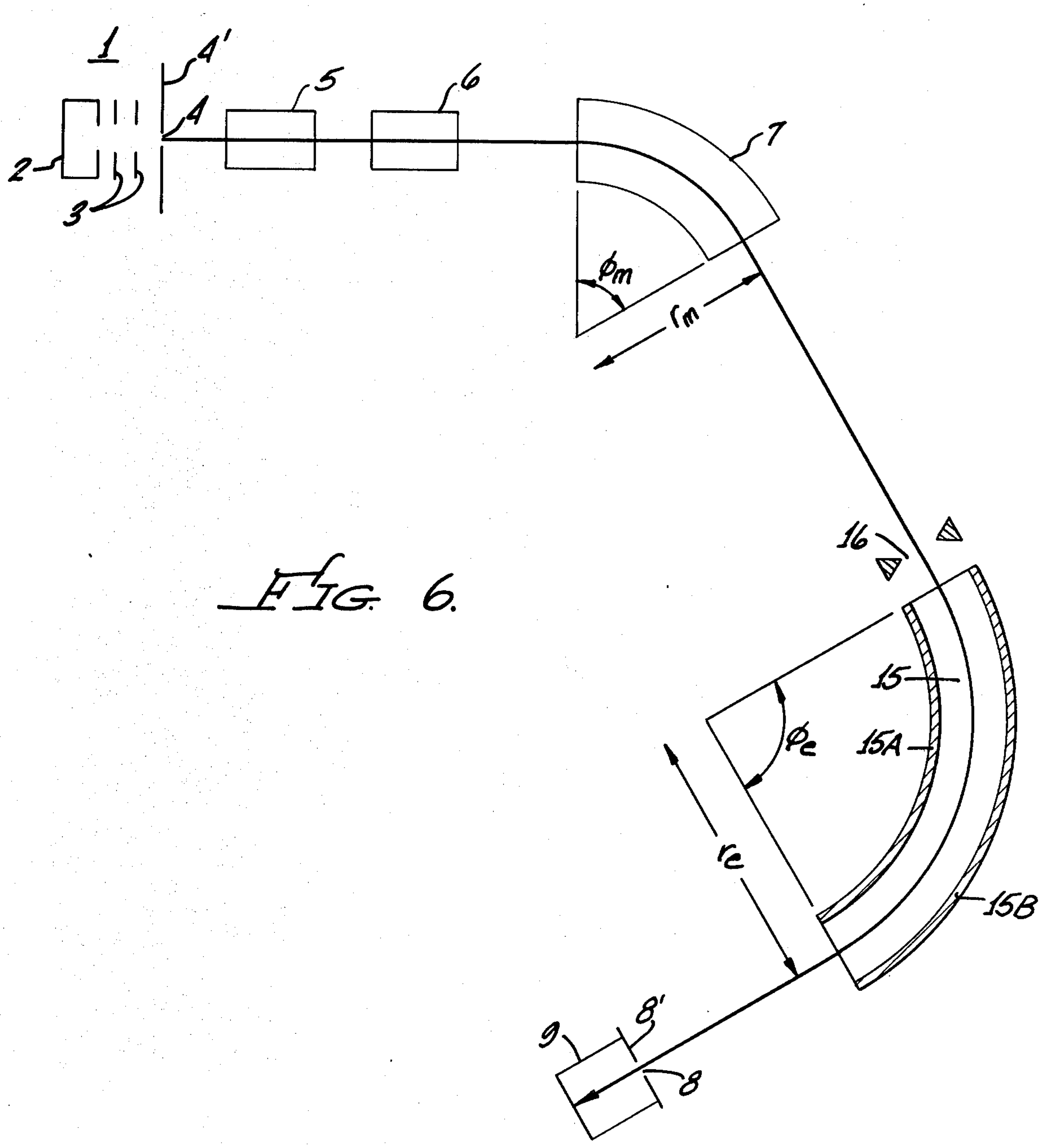
FIG. 6 is a schematic view of a third embodiment of the present invention.

Referring now to FIG. 6, there is shown an embodiment of the present invention wherein a toroidal electric field 15 is provided between deflecting magnetic field 7 and detector slit 8, thereby giving the ion beam directional focusing as well as energy focusing or, in other words, the so-called stigmatic second order double focusing property. The electric field is formed by a pair of parallel, curved electrodes 15A and 15B. A means forming a slit 16 is positioned between magnetic field 7 and electric field 15. As a result of this configuration, the energy focusing of the ion which arrives at detector 9 is improved in respect of its efficiency in the analysis. FIGS. 7(*a*) and 7(*b*) show, in the x and y directions, respectively, the orbit of ions passing through the embodiment of FIG. 6.

As indicated in FIGS. 8 and 9, the ion beam may be provided with the stigmatic second order focusing property by making the second order aberration coefficients smaller by either constructing the boundary surface of deflecting magnetic field 7 as a curved surface or constructing it at an angle to the optical axis. Examples of designs with specific values and second order aberration coefficients achieved by these embodiments of the present invention will be explained hereinbelow. That is, in Table 1, the letters (a), (b), (d), (e), and (f) denote design examples of embodiments according to the present invention, the letter (c) denotes an example of the structure shown in FIG. 4 where a single electrostatic quadrupole lens is used, and the letter (g) denotes a prior art example shown for comparison purposes for a system which is identical to the one shown in FIG. 1 except for the inclusion of lenses 5 and 6. In Table 1, values normalized with the radius of curvature $r_m$ of the magnetic field 7 are used for all lengths. Reference symbols denote the following:

- $\phi_m$: the deflecting angle of an ion beam by the magnetic field (in degrees),
- $r_m$: the radius of the central orbit of the ion beam in magnetic field 7,
- $R_1$: the radius of curvature of the boundary surface of the magnetic field at the point of beam incidence,
- $\epsilon_1$: the incident angle of the ion beam to magnetic field 7 (in degrees),
- $\epsilon_2$: the exit angle of the ion beam from magnetic field 7 (in degrees);
- $QK_1$: a constant to express the potential gradient of the first electrostatic quadrupole lens $Q_1$,
- $QK_2$: a constant to express the potential gradient of the second electrostatic quadrupole lens $Q_2$,
- $Q_L$: the length of both lenses $Q_1$ and $Q_2$,
- $L_1$: the distance from the ion source slit to lens $Q_1$,
- $L_2$: the distance from lens $Q_1$ to lens $Q_2$,
- $L_3$: the distance from lens $Q_2$ to the entrance of magnetic field 7,
- $L_4$: the distance from the exit of magnetic field 7 to detector slit 8,
- $A_x$: the image magnification factor,
- $A_\gamma$: the mass dispersion coefficient,
- $A_{\alpha\alpha}$, $A_{yy}$, $A_{y\beta}$, $A_{\beta\beta}$: second order aberration coefficients,
- $A_y$: the coefficient due to the spread of the image by y in the direction y,
- $A_\beta$: the coefficient due to spread of the image by $\beta$ in the direction y.

TABLE 1

| | (a) | (b) | (c) | (d) | (e) | (f) | (g) |
|---|---|---|---|---|---|---|---|
| $\phi_m$ | 60 | 60 | 60 | 70 | 80 | 90 | 60 |
| $r_m/R_1$ | 0 | 0.424 | 0 | 0.852 | 1.441 | 2.537 | 0 |
| $\epsilon_1 = \epsilon_2$ | −16.17° | 0 | −16.12° | 0 | 0 | 0 | 0 |
| $QK_1$ | −2.55 | −2.3 | −1.7 | −2.4 | −2.3 | −2.3 | — |
| $QK_2$ | −2.55 | −2.3 | — | −2.5 | −2.4 | −2.3 | — |
| $Q_L$ | 0.3 | 0.3 | 2.0 | 0.3 | 0.3 | 0.3 | — |
| $L_1$ | 0.25 | 0.2 | 0.1 | 0.3 | 0.2 | 0.2 | 1.732 |
| $L_2$ | 1.1 | 1.1 | — | 1.0 | 1.1 | 1.1 | — |
| $L_3$ | 0.6 | 1.0 | 0.6 | 0.7 | 0.5 | 0.3 | — |
| $L_4$ | 1.210 | 1.925 | 1.124 | 1.708 | 1.374 | 1.154 | 1.732 |
| $A_x$ | −0.129 | −0.194 | −0.055 | −0.165 | −0.183 | −0.192 | −1 |
| $A_\gamma$ | 0.687 | 1.084 | 0.654 | 1.131 | 1.090 | 1.077 | 1 |
| $A_{\alpha\alpha}$ | −0.01 | 0.03 | −0.06 | 0.01 | −0.01 | 0.00 | −1 |
| $A_{yy}$ | −0.64 | −1.27 | −0.42 | −1.17 | −1.49 | −2.35 | −1.03 |
| $A_{y\beta}$ | 0.50 | −1.22 | 1.41 | −0.57 | 0.41 | 1.34 | −4.68 |
| $A_{\beta\beta}$ | −1.65 | −1.97 | −3.36 | −2.61 | −2.43 | −2.24 | −6.75 |
| $A_y$ | 0.49 | −0.77 | −0.43 | −0.19 | −0.37 | −0.84 | 1.11 |
| $A_\beta$ | −3.17 | −3.30 | −4.09 | −3.50 | −2.95 | −2.24 | 4.75 |
| $A_\gamma/A_x$ | 5.33 | 5.59 | 11.89 | 6.86 | 5.96 | 5.61 | 1 |

TABLE 1-continued

| | (a) | (b) | (c) | (d) | (e) | (f) | (g) |
|---|---|---|---|---|---|---|---|
| g (mm) | 4.27 | 6.85 | 6.45 | 5.82 | 5.81 | 6.33 | 10.77 |

The letter "g" in the bottom line in Table 1 denotes the maximum width (in millimeters) of the spreading ion beam between the magnetic pole pieces (wherein the radius of the orbit is 0.2 m, the length of the ion source slit in the y direction is 5 mm, and the inclination angle of the ion beam in the y direction is 0.01 radian). As is obvious from Table 1, the ratio of the mass dispersion coefficient to the image magnification $A_\gamma/A_x$, (see equation (1)) becomes 5 to 7 times as large as a conventional device and g becomes about 40% to 60% of that with a conventional device. By such an arrangement, the sensitivity in measurement can be intensified and the deflecting magnetic field can be strengthened.

Table 2 lists design examples and the second order aberration coefficient of an embodiment of the present invention which includes a toroidal electric field as shown in the embodiment of FIG. 6. The examples in columns (a) to (e) in Table 2 are structured as shown in FIG. 6 and, more particularly, the examples in columns (c), (d), and (e) are structured without providing a curvature on the boundary surface of the deflecting magnetic field so as to make the second order aberration smaller. Column (f) in Table 2 is for a configuration of the prior art shown, for comparison purposes only, for a configuration which is identical in construction with the construction shown in FIG. 6, except for the electrostatic quadrupole lenses 5 and 6. In all cases, the length is the value normalized with the radius of curvature of the deflecting magnetic field.

The reference symbols used in Table 2 are as follows:

$R_{m1}$: the radius of curvature of the incident boundary of magnetic field 7, $R_{m2}$: the radius of curvature of the exit boundary of magnetic field 7, $\phi_e$: the deflecting angle of the ion beam within electric field 15 (in degrees), $r_e$: the radius of the orbit of the ion beam within electric field 15, $C_1$, $C_2$: coefficients of the toroidal electric field 15, $R_{e1}$: the radius of curvature at the incident boundary of electric field 15, $R_{e2}$: the radius of curvature of the exit boundary of electric field 15, $L_5$: the disrance from the exit of magnetic field 7 to the entrance of electric field 15, $L_6$: the disrance from the exit of electric field 15 to detector slit 8, $A_{\alpha\alpha}$: the second order aberration coefficient related to the angle of beam defletion in the x direction, $A_{\alpha\delta}$: the second order aberration coefficient related to the angle of beam deflection in the x direction and to the spread of the energy of the beam, $A_{\delta\delta}$: second order aberration coefficient related to the spreading of the energy of the beam, $A_{yy}$, $A_{y\beta}$, $A_{\beta\beta}$: second order aberration coefficients related to the spreading of the beam in the y direction.

TABLE 2

| | (a) | (b) | (c) | (d) | (e) | (f) |
|---|---|---|---|---|---|---|
| $\phi_m$ | 72.5 | 72.5 | 70 | 60 | 60 | 55 |
| $r_m/R_{ml}$ | −0.559 | −0.769 | 0 | 0 | 0 | 0 |
| $r_m/R_{m2}$ | 0.37 | 0.49 | 0 | 0 | 0 | 0 |
| $\phi_e$ | 90 | 90 | 90 | 90 | 90 | 81.51 |
| $r_e$ | 0.9 | 0.9 | 0.98 | 0.97 | 0.97 | 1.276 |
| $C_1$ | 0.57 | 0.55 | 0.58 | 0.59 | 0.59 | 0 |
| $C_2$ | 1.056 | 1.029 | −0.084 | −0.251 | −0.265 | 0 |
| $r_e/R_{el}$ | 2.36 | 2.11 | 0 | 0 | 0 | 0 |
| $r_eR_{e2}$ | 1.30 | 1.40 | 0 | 0 | 0 | 0 |
| $Q_L$ | 0.3 | 0.4 | 0.3 | 0.3 | 0.3 | — |
| $QK_1$ | −2.56 | −2.08 | −2.56 | −2.52 | −2.50 | — |
| $QK_2$ | −2.60 | −2.21 | −2.60 | −2.52 | −2.50 | — |
| $L_1$ | 0.2 | 0.25 | 0.2 | 0.25 | 0.38 | 1.424 |
| $L_2$ | 1.0 | 1.0 | 1.0 | 1.1 | 1.1 | — |
| $L_3$ | 0.65 | 0.6 | 0.73 | 0.94 | 0.93 | — |
| $L_5$ | 2.059 | 2.053 | 1.986 | 2.447 | 2.455 | 3.422 |
| $L_6$ | 0.770 | 0.734 | 1.158 | 1.037 | 1.031 | 0.498 |
| $A_x$ | 0.215 | 0.186 | 0.271 | 0.249 | 0.217 | 1.553 |
| $A_\gamma$ | −1.452 | −1.412 | −1.848 | −1.746 | 1.742 | −1.237 |
| $A_{\alpha\alpha}$ | −0.04 | 0.02 | 0.02 | 0.01 | −0.03 | −0.09 |
| $A_{\alpha\delta}$ | −0.01 | 0.07 | 0.49 | −0.23 | 0.15 | 0.60 |
| $A_{\delta\delta}$ | 0.08 | 0.04 | 0.85 | 0.58 | 0.54 | −1.06 |
| $A_{yy}$ | 0.28 | 0.23 | 0.74 | 0.69 | 0.80 | 1.26 |
| $A_{y\beta}$ | 0.53 | 0.68 | 0.88 | 0.37 | 0.37 | 4.42 |
| $A_{\beta\beta}$ | 0.53 | 0.71 | −0.93 | 0.12 | 0.34 | 4.11 |
| $A_y$ | 0.60 | 0.54 | 0.42 | 0.33 | 0.35 | 1.30 |
| $A_\beta$ | −0.77 | −1.08 | −0.06 | 0.02 | 0.04 | 8.68 |
| $A_\gamma/A_x$ | 6.75 | 7.59 | 6.82 | 7.01 | 8.03 | 0.80 |
| g (mm) | 4.22 | 4.13 | 4.10 | 4.17 | 4.19 | 9.94 |

The letter g in the bottom row of Table 2 denotes the maximum width of the spreading ion beam within the magnetic pole pieces as in Table 1. It is obvious from Table 2 that the ratio of the mass dispersion coefficient against the image magnification factor, $A_\gamma/A_x$ is considerably larger according to the present invention while g becomes smaller than that obtainable from prior art devices. The present device can thus achieve a higher sensitivity and a greater intensity in the deflcting magnetic field 7.

Figure 11:
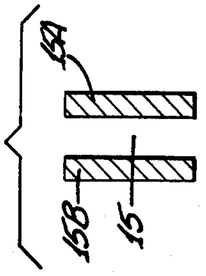
FIG. 11 is a sectional view taken along the line B—B in FIG. 10.
Figure 10:
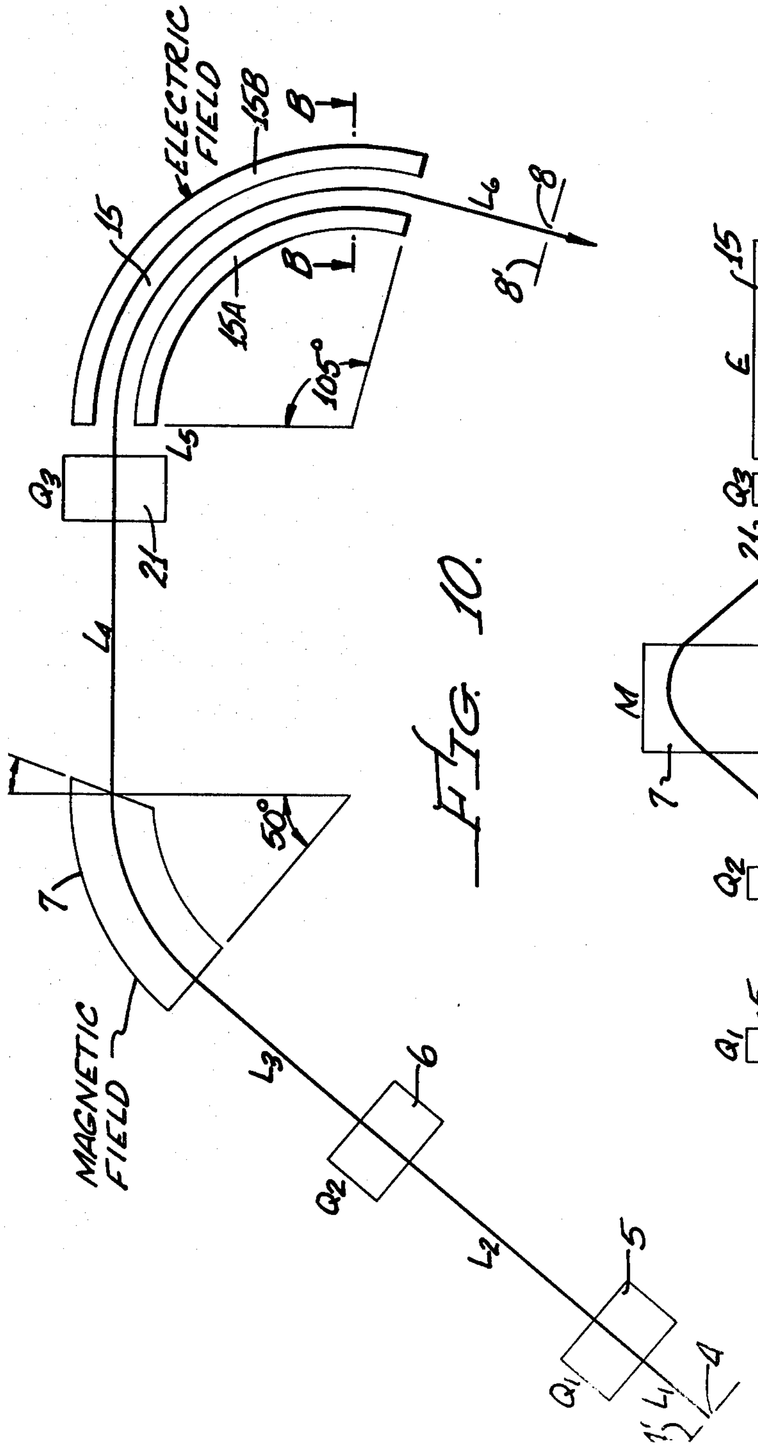
FIG. 10 is a schematic view of a fourth embodiment of the present invention.
Figure 12:
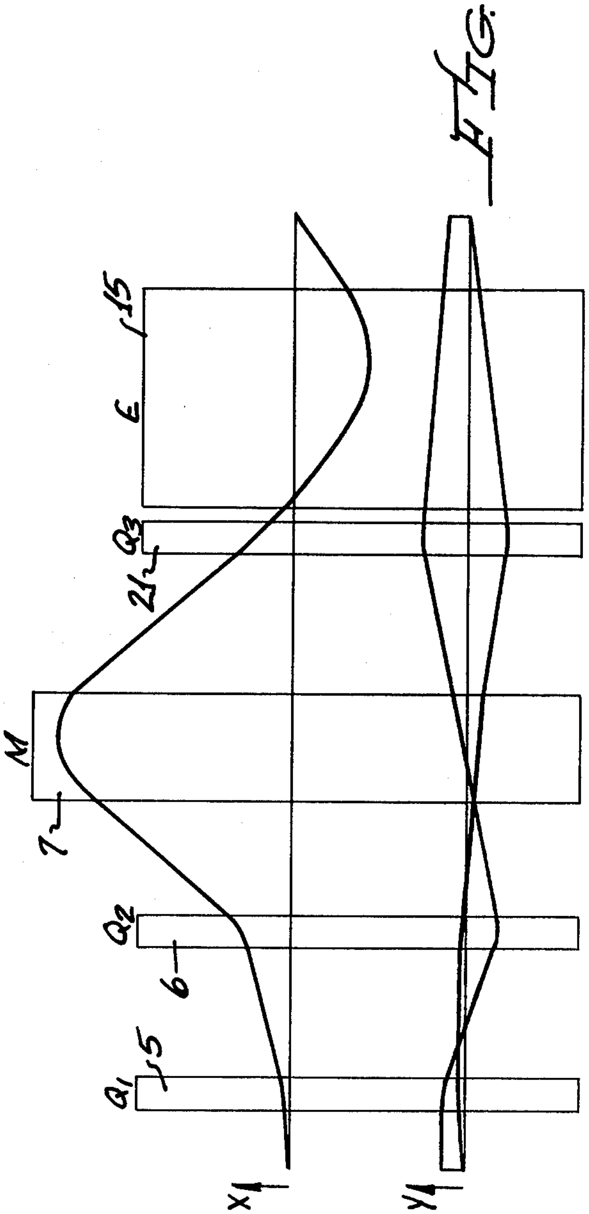
FIG. 12 shows the ion orbits of the embodiment of FIG. 10 in the vertical and radial planes.

Referring now to FIGS. 10-12, there is shown another embodiment of the present invention which is essentially identical to the embodiment of FIG. 6 except that a separate electrostatic quadrupole lens 21 is provided at the entrance of electric field 15. Electric field 15 is formed by two concentric cylindrical electrodes 15A and 15B. FIG. 11 shows the cross section of electrodes 15A and 15B as taken along the line B—B in FIG. 10. FIG. 12 is a view of the orbit of the ion beam which is obtained. This structure is advantageous in that it does not require special manufacturing machines because of its very simple structure.

Table 3 shows examples derived with the embodiment of FIG. 10. In deriving the figures for Table 3, the samples used are similar to those used for Tables 1 and 2 except for $QK_3$ which denotes the potential gradient of the third electrostatic quadrupole lens 21. In all cases, $r_m = r_e = 1$.

TABLE 3

| | (a) | (b) | (c) | (d) | (e) |
|---|---|---|---|---|---|
| $\phi_m$ | 50 | 50 | 50 | 50 | 50 |
| $\phi_e$ | 105 | 105 | 100 | 95 | 90 |
| $r_e$ | 1.0 | 0.95 | 1.0 | 1.0 | 1.0 |
| $r_m/R_{ml}$ | −0.4095 | −0.5345 | −0.5811 | −0.6905 | −0.8894 |
| $\epsilon_2$ | −20 | −21 | −22 | −23 | −25 |
| $r_e/R_{e2}$ | −2.66 | −1.50 | −1.38 | −1.15 | −0.90 |
| $Q_L$ | 0.25 | 0.25 | 0.25 | 0.25 | 0.25 |
| $QK_1$ = | −2.85 | −2.85 | −2.85 | −2.85 | −2.85 |

TABLE 3-continued

| | (a) | (b) | (c) | (d) | (e) |
|---|---|---|---|---|---|
| $QK_2$ | | | | | |
| $QK_3$ | −1.85 | −1.75 | 1.79 | −1.78 | −1.78 |
| $L_1$ | 0.5 | 0.5 | 0.5 | 0.5 | 0.5 |
| $L_2$ | 1.1 | 1.1 | 1.1 | 1.1 | 1.1 |
| $L_3$ | 0.97 | 0.97 | 0.95 | 0.97 | 0.96 |
| $L_4$ | 1.1951 | 1.1389 | 1.1036 | 1.0535 | 0.9844 |
| $L_5$ | 0.1 | 0.1 | 0.1 | 0.1 | 0.1 |
| $L_6$ | 0.6166 | 0.5994 | 0.8282 | 1.0243 | 1.3166 |
| $A_x$ | 0.147 | 0.141 | 0.162 | 0.175 | 0.199 |
| $A_\gamma$ | −1.169 | −1.117 | −1.275 | −1.390 | −1.570 |
| $A_{\alpha\alpha}$ | −0.02 | −0.02 | −0.01 | 0.03 | 0.02 |
| $A_{\alpha\delta}$ | −0.04 | 0.05 | 0.07 | −0.02 | −0.20 |
| $A_{\sigma\delta}$ | −0.06 | 0.01 | 0.07 | 0.17 | 0.29 |
| $A_{yy}$ | 0.13 | 0.05 | 0.16 | 0.08 | 0.04 |
| $A_{y\beta}$ | 0.12 | 0.22 | 0.04 | 0.14 | 0.10 |
| $A_{\beta\beta}$ | 0.13 | 0.29 | 0.36 | 0.32 | 0.28 |
| $A_y$ | 0.73 | 1.27 | 1.11 | 1.20 | 1.31 |
| $A_\beta$ | 0.12 | −0.86 | −0.44 | −0.54 | −0.60 |
| $A_\gamma/A_x$ | 7.95 | 7.92 | 7.87 | 7.94 | 7.89 |
| g (mm) | 5.7 | 5.7 | 5.5 | 5.7 | 5.6 |

As described in the foregoing, the present invention is capable of converging an ion beam in the vertical direction to the median plane thereof and of diverging the same in the orthogonal direction thereof with electrostatic quadrupole lenses to minimize the gap spacing between the magnetic pole pieces which form a deflecting magnetic field, thereby improving sensitivity and detection as well as accuracy in measurement. Since the magnetic field can be intensified by making the gap spacing between the magnetic pole pieces narrower, the device can be applicable to a wider scope of application, such as to analysis of ions of greater mass or ions of higher molecules. A device embodying the present invention is simple in construction and low in cost.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A mass spectrometer of the type comprising an ion source for emitting accelerated ions, means forming a slit through which ions are emitted from said source, a deflecting magnetic field for deflecting said ions after said ions pass through said slit, and an ion detector to detect ions exiting from said magnetic field, the intensity of the deflecting magnetic field being variable, the improvement wherein:

at least one electrostatic quadrupole lens is positioned between said slit and said magnetic field to give a converging property to said ion beam in a direction vertical to the median plane thereof and a diverging property in a direction radial thereto.

2. In a mass spectrometer according to claim 1, the improvement wherein a pair of electrostatic quadrupole lenses are positioned between said slit and said deflecting magnetic field.

3. In a mass spectrometer according to claim 1, the improvement wherein two electrostatic quadrupole lenses are positioned between said slit and said deflecting magnetic field and the distance $L_2$ therebetween is expressed as:

$$L_2 > \frac{2\cot(Q_K \cdot Q_L)}{Q_K}$$

wherein $Q_L$ is the length of each of said lenses, $Q_K$ is a constant to express the intensity of said lenses and is determined by the equation, $$Q_K = \sqrt{\frac{V}{U}} \cdot \frac{1}{r_0}$$

wherein

U is the ion accelerating voltage,

V is the voltage supplied to said lenses, and $r_0$ is the radius of the circle inscribed within the electrodes forming said lenses, and all lengths are normalized with the radius of the orbit of the deflecting magnetic field.

4. In a mass spectrometer according to claim 1, 2, or 3, the improvement wherein the ion beam in the deflecting magnetic field is given a stigmatic second order focusing property by varying the intensity of the electric field of the electrostatic quadrupole lens.

5. In a mass spectrometer according to claim 1, 2, or 3, the improvement wherein the ion beam in the deflecting magnetic field is given a stigmatic second order focusing property by varying the deflecting angle of the deflecting magnetic field.

6. In a mass spectrometer according to claim 1, 2, or 3, the improvement wherein the ion beam in the deflecting magnetic field is given a stigmatic second order focusing property by varying the incident angle of the ion beam to the deflecting magnetic field.

7. In a mass spectrometer according to claim 1, 2, or 3, the improvement wherein the ion beam in the deflecting magnetic field is given a stigmatic second order focusing property by varying the curvature of the deflecting magnetic field on the boundary surface thereof.

8. In a mass spectrometer according to claim 1, 2, or 3, the improvement wherein a toroidal electric field is provided between said deflecting magnetic field and said ion detector.

9. In a mass spectrometer according to claim 8, the improvement wherein the ion beam in said toroidal electric field is given a stigmatic second order double focusing property by varying the radius of the central orbit in the toroidal electric field.

10. In a mass spectrometer according to claim 8, the improvement wherein the ion beam in said toroidal electric field is given a stigmatic second order double focusing property by varying the coefficient of the toroidal electric field.

11. In a mass spectrometer according to claim 8, the improvement wherein the ion beam in said toroidal electric field is given a stigmatic second order double focusing property by varying the curvature of the toroidal electric field at the boundary thereof.

12. In a mass spectrometer according to claim 1, 2, or 3, the improvement wherein a separate electrostatic quadrupole lens and a cylindrical electric field are positioned between said deflecting magnetic field and said ion detector.

13. In a mass spectrometer according to claim 12, the improvement wherein the ion beam in the cylindrical electric field is given a stigmatic second order double focusing property by varying the intensity of the electric field of said electrostatic quadrupole lens.

14. In a mass spectrometer according to claim 12, the improvement wherein the ion beam in the cylindrical electric field is given a stigmatic second order double focusing property by varying the deflecting angle of the cylindrical field.

15. In a mass spectrometer according to claim 12, the improvement wherein the ion beam in the cylindrical electric field is given a stigmatic second order double focusing property by varying the radius of the central orbit.

16. In a mass spectrometer according to claim 12, the improvement wherein the ion beam in the cylindrical electric field is given a stigmatic second order double focusing property by varying the distance between the deflecting magnetic field and the electrostatic quadrupole lens.

17. In a mass spectrometer according to claim 12, the improvement wherein the ion beam in the cylindrical electric field is given a stigmatic second order double focusing property by varying the distance between the electrostatic quadrupole lens and the cylindrical electric field.

18. In a mass spectrometer according to claim 12, the improvement wherein the ion beam in the cylindrical electric field is given a stigmatic second order double focusing property by varying the distance between the cylindrical electric field and the ion detector.

* * * * *